(12) United States Patent
Jeong et al.

(10) Patent No.: US 11,165,358 B2
(45) Date of Patent: Nov. 2, 2021

(54) SWITCHING CONTROL METHOD FOR ISOLATED BIDIRECTIONAL DC-DC CONVERTER

(71) Applicant: HYOSUNG HEAVY INDUSTRIES CORPORATION, Seoul (KR)

(72) Inventors: Byung Hwan Jeong, Gwacheon-si (KR); Jeong Min Lee, Seoul (KR)

(73) Assignee: HYOSUNG HEAVY INDUSTRIES CORPORATION, Seoul (KR)

( * ) Notice: Subject to any disclaimer, the term of this patent is extended or adjusted under 35 U.S.C. 154(b) by 215 days.

(21) Appl. No.: 16/473,753

(22) PCT Filed: Dec. 5, 2017

(86) PCT No.: PCT/KR2017/014165
§ 371 (c)(1),
(2) Date: Jun. 26, 2019

(87) PCT Pub. No.: WO2018/124521
PCT Pub. Date: Jul. 5, 2018

(65) Prior Publication Data
US 2021/0126542 A1    Apr. 29, 2021

(30) Foreign Application Priority Data

Dec. 30, 2016    (KR) .................... 10-2016-0184376

(51) Int. Cl.
*H02J 7/34* (2006.01)
*H02M 3/335* (2006.01)
*H02J 3/32* (2006.01)

(52) U.S. Cl.
CPC .......... *H02M 3/33584* (2013.01); *H02J 3/32* (2013.01); *H02J 7/345* (2013.01); *H02J 2207/20* (2020.01)

(58) Field of Classification Search
CPC ........ H02M 3/33584; H02J 3/32; H02J 7/345; H02J 2207/20
See application file for complete search history.

(56) References Cited

U.S. PATENT DOCUMENTS 9,263,961 B2 *  2/2016  Jacobson ............ H02M 3/3376
2009/0015199 A1 *  1/2009  Kitanaka ............... H02J 7/0029
320/118
(Continued)

FOREIGN PATENT DOCUMENTS

EP       2660950 A2    11/2013
GN      106019168 A    10/2016
(Continued)

OTHER PUBLICATIONS

Harrye Yasen A et al., "Comprehensive steady state analysis of bidirectional dual active bridge DC/DC converter using triple phase shift control", 2014 IEEE 23rd International Symposium on Industrial Electronics (ISIE), Jun. 1, 2014, pp. 437-442.

*Primary Examiner* — Adolf D Berhane
(74) *Attorney, Agent, or Firm* — Novick, Kim & Lee, PLLC; Jae Youn Kim

(57) ABSTRACT

Provided is a switching control method for an isolated bidirectional DC-DC converter, wherein the isolated bidirectional DC-DC converter connected between a DC grid system and a battery uses multiple switching controls together depending on a voltage of the battery, thereby facilitating high efficiency control. In the isolated bidirectional DC-DC converter according to the present invention, switching of a first switching unit and a second switching unit is controlled to control the flow of power by changing the bidirectional DC-DC voltage between the DC grid system and the battery, and the first and the second switching unit are switched using PSM switching control, SPWM switching control, and DPWM switching control together (Continued)

depending on a voltage with which the battery is charged and load capacity, thereby enhancing efficiency of the system.

5 Claims, 2 Drawing Sheets

(56) References Cited

U.S. PATENT DOCUMENTS

| | | | | |
|---|---|---|---|---|
| 2011/0249472 A1* | 10/2011 | Jain | .................. | H02M 3/33584 |
| | | | | 363/15 |
| 2013/0039104 A1* | 2/2013 | Sharma | .................. | H02M 1/10 |
| | | | | 363/123 |
| 2014/0152251 A1* | 6/2014 | Kim | ........................ | H02J 50/90 |
| | | | | 320/108 |
| 2014/0313784 A1* | 10/2014 | Strzalkowski | .... | H02M 3/33584 |
| | | | | 363/17 |
| 2015/0349649 A1* | 12/2015 | Zane | .................. | H02M 1/4241 |
| | | | | 363/21.03 |
| 2016/0172877 A1* | 6/2016 | Xue | ...................... | H02M 7/797 |
| | | | | 320/145 |
| 2016/0352236 A1* | 12/2016 | Yoo | .................. | H02M 3/33584 |
| 2017/0310234 A1* | 10/2017 | Wagoner | ........... | H02M 3/33576 |

FOREIGN PATENT DOCUMENTS

| | | |
|---|---|---|
| KR | 10-2008-0093177 A | 10/2008 |
| KR | 10-2012-0089751 A | 8/2012 |
| KR | 10-1338147 B1 | 12/2013 |
| KR | 10-2016-0033438 A | 3/2016 |
| KR | 10-2016-0066099 A | 6/2016 |
| KR | 10-2016-0109574 A | 9/2016 |

* cited by examiner

SWITCHING CONTROL METHOD FOR ISOLATED BIDIRECTIONAL DC-DC CONVERTER

TECHNICAL FIELD

The present invention relates generally to switching control of an isolated bidirectional DC-DC converter. More particularly, the present invention relates to a switching control method for an isolated bidirectional DC-DC converter, wherein the isolated bidirectional DC-DC converter connected between a DC grid system and a battery uses multiple switching controls together depending on a voltage of the battery so that high efficiency control is possible.

BACKGROUND ART

Recently, power consumption patterns have changed from AC power to DC power due to an increase in digital loads, electric vehicles, and the like. Also, there is growing interest in a DC grid system that is capable of maximizing effects of solar power, wind power, and distributed power of an energy storage system (ESS).

When the DC grid system is connected to a distributed power system, the energy storage system (ESS) is used to store surplus energy generated from renewable energy, such as solar power, wind power, and the like. Further, when a DC distribution system is unstable or power failure occurs, using as reference DC power is possible, such that the degradation of reliability and of stability is reduced even though there is a problem in power supply.

Therefore, bidirectional DC-DC converters are widely used to connect the DC grid system and the ESS (or a battery). Generally, the bidirectional DC-DC converters are classified into a non-isolated type and an isolated type according to a type of isolation. Isolated bidirectional DC-DC converters are mainly used for system stability.

In the case of a bidirectional DC-DC converter in which a phase-shifted ZVS converter and an isolated boost converter are combined, which is the most widely studied bidirectional DC-DC converter in recent years among the isolated bidirectional DC-DC converters, a leakage inductor component is used at the primary side of the transformer and a high-capacity inductor is used at the output side.

The bidirectional DC-DC converter operates in the same manner as the phase-shifted ZVS converter during forward operation in which power flows from the primary side to the secondary side of the transformer, and operates in the same manner as the boost converter during the backward operation.

However, when the bidirectional DC-DC converter with the above-described form is applied to a light load, zero voltage switching (ZVS) is not performed. In the case of the backward operation, large spikes occur in the switch due to the difference in energy stored in the inductor at the output side and the leakage inductor at the primary side of the transformer.

In order to solve the problem, Korean Patent No. 10-1338147 discloses a bidirectional DC-DC converter operating in the form of an LLC resonant converter or a dual active band (DAB) converter depending on the characteristics of the load connected to the DC-DC converter or on the direction of power flow, whereby optimum efficiency and output control are provided regardless of the type of load connected to the primary side or the secondary side.

However, in the bidirectional DC-DC converter disclosed in Korean Patent No. 10-1338147, even though phase shift modulation (PSM) switching control is applied in a region equal to or greater than a light load by switching of a semiconductor element in a full-bridge circuit, zero voltage switching (ZVS) is not achieved. Also, even though PSM switching control is used, copper loss and core loss are high due to high peak current flowing in a high frequency transformer and an auxiliary inductor, such that system efficiency decreases.

Further, in addition to PSM in the DC-DC converter, single pulse width modulation (SPWM) technology and double pulse width modulation (DPWM) technology have been proposed, but this does not consider the efficiency of the converter.

DISCLOSURE

Technical Problem

Accordingly, the present invention has been made keeping in mind the above problems occurring in the related art, and an object of the present invention is to provide a switching control method for an isolated bidirectional DC-DC converter, wherein the bidirectional DC-DC converter provided between a DC grid system and a battery uses phase shift modulation (PSM) switching control, single pulse width modulation (SPWM) switching control, and double pulse width modulation (DPWM) switching control, together depending on a voltage of the battery, thereby enhancing efficiency of the converter.

Technical Solution

According to an embodiment of the present invention, a switching control method for an isolated bidirectional DC-DC converter has: a first circuit breaking unit breaking a line connected to a DC grid system when malfunction occurs; a first line breaking unit connected to the first circuit breaking unit in parallel and breaking a line depending on operation; a first capacitor charging with a voltage supplied from the DC grid system; a first switching unit connected to the first capacitor in parallel and having multiple switches in a full-bridge form; a transformer provided with a primary side winding to which an output terminal of the first switching unit is connected; a second switching unit having multiple switches in a full-bridge form connected to a secondary side output terminal of the transformer; a second capacitor storing an output voltage of the second switching unit and charging the battery; a switching control unit controlling switching of the first switching unit and the second switching unit; a second circuit breaking unit breaking a line connected to the battery when malfunction occurs; and a second line breaking unit connected to the second circuit breaking unit in parallel and breaking a line depending on operation, wherein bidirectional power flow between the DC grid system and the battery is switched, the method including: determining whether a voltage of the DC grid system is a preset input voltage; turning on the first line breaking unit and the second line breaking unit when being the preset input voltage, and charging the first capacitor and the second capacitor with initial voltages; detecting the initial voltages of the first capacitor and the second capacitor; turning on the first circuit breaking unit and the second circuit breaking unit when the detected initial voltages are a first reference voltage preset; turning off the first line breaking unit and the second line breaking unit after the first circuit breaking unit and the second circuit breaking unit are turned on; detecting, in real time, charge voltages with which the first capacitor and the second capacitor are charged; detecting load capacity of a load connected to the battery; and switching the first switching unit and the second switching unit depending on the charge voltages of the first capacitor and the second capacitor and on the load capacity, wherein the switching is performed using phase shift modulation (PSM), single pulse width modulation (SPWM), and double pulse width modulation (DPWM) switching controls together.

In a case where the charge voltage of the second capacitor is equal to or less than a second reference voltage preset, when the load capacity is equal to or lower than a preset reference value of rated capacity of the load, the first switching unit and the second switching unit may be switched with the DPWM switching control, and when being greater than the reference value, the first switching unit may be switched with the SPWM switching control and the second switching unit may be switched with the PSM switching control.

In a case where the charge voltage of the second capacitor is between the second reference voltage and a third reference voltage preset, when the load capacity is equal to or less than the reference value, the first switching unit may be switched with the SPWM switching control and the second switching unit may be switched with the PSM switching control, and when being greater than the reference value, the first switching unit and the second switching unit may be switched with the PSM switching control.

In a case where the charge voltage of the second capacitor is equal to or greater than the third reference voltage, when the load capacity is equal to or less than the reference value, the first switching unit and the second switching unit may be switched with the DPWM switching control, and when being greater than the reference value, the first switching unit may be switched with the PSM switching control and the second switching unit may be switched with the SPWM switching control.

The second reference voltage may be lower than the charge voltage of the first capacitor, and the third reference voltage may be higher than the charge voltage of the first capacitor.

The reference value may be in a range of 15 to 25% of the rated capacity of the load.

Advantageous Effects

According to the present invention, in the isolated bidirectional DC-DC converter connected between the DC grid system and the battery, when the voltage of the battery fluctuates, switching of the DC-DC converter is performed using PSM, SPWM, and DPWM together depending on the voltage of the battery and load capacity, thereby enhancing overall average efficiency of the system.

MODE FOR INVENTION

Figure 1:
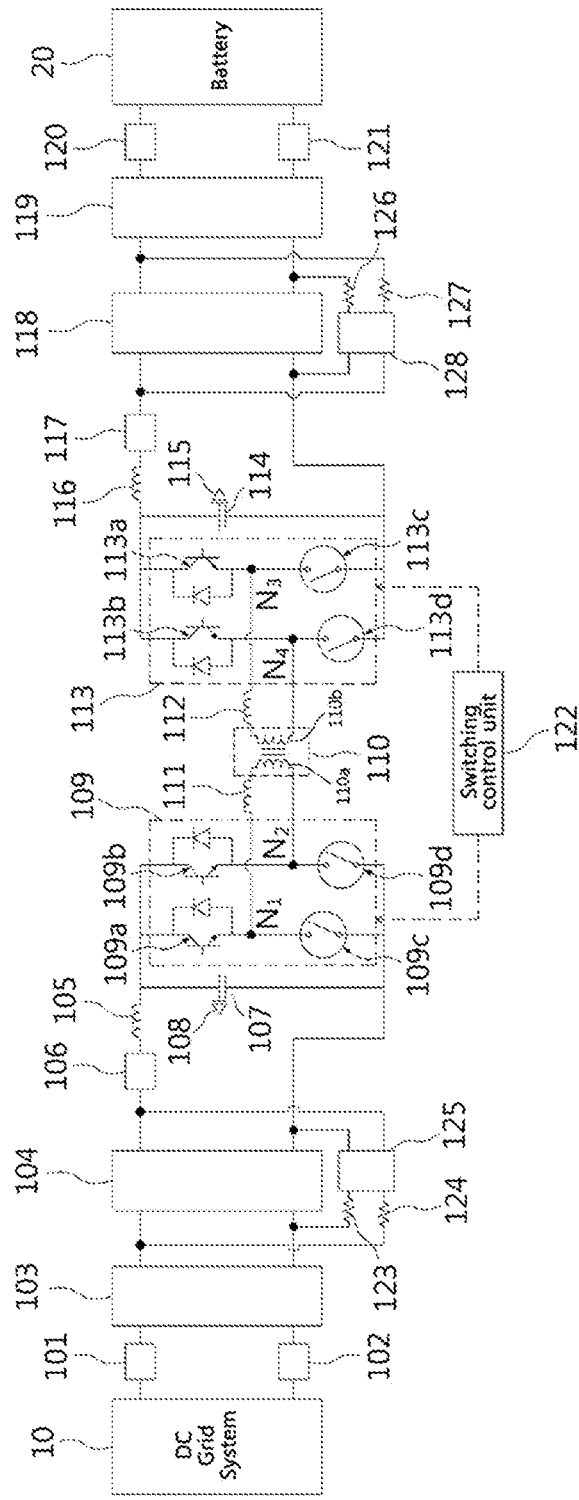
FIG. 1 is a diagram illustrating a configuration of an isolated bidirectional DC-DC converter according to an embodiment of the present invention.

Hereinafter, exemplary embodiments of the present invention will be described in detail with reference to the accompanying exemplary drawings. It is to be noted that in assigning reference numerals to elements in the drawings, the same reference numerals designate the same elements throughout the drawings although the elements are shown in different drawings. Also, in the description of the present invention, the detailed descriptions of known related constitutions or functions thereof may be omitted if they make the gist of the present invention unclear.

Further, when describing the elements of the present invention, terms such as first, second, A, B, (a), (b), etc. may be used. Since these terms are provided merely for the purpose of distinguishing the elements from each other, they do not limit the nature, sequence or order of the elements. It is to be noted that when an element is referred to as being "coupled to", "combined with", or "connected to" another element, it can be directly "coupled to", "combined with", or "connected to" the other element or intervening elements may be present therebetween.

FIG. 1 is a diagram illustrating a configuration of an isolated bidirectional DC-DC converter according to an embodiment of the present invention.

Referring to FIG. 1, the isolated bidirectional DC-DC converter 100 according to the present invention controls bidirectional current flow through switching between a DC grid system 10 and a battery 20. To this end, fundamentally included are: a first circuit breaking unit 104 breaking a line connected to the DC grid system 10 when malfunction occurs; a first line breaking unit 125 connected to the first circuit breaking unit 104 in parallel and breaking a line depending on operation; a first capacitor 107 charging with a voltage supplied from the DC grid system 10; a first switching unit 109 connected to the first capacitor 107 in parallel and including multiple switches 109a to 109d in a full-bridge form; a transformer 110 provided with a primary side winding to which an output terminal of the first switching unit 109 is connected; a second switching unit 113 connected to a secondary side output terminal of the transformer 110 and including multiple switches 113a to 113d in a full-bridge form; a second capacitor 114 storing an output voltage of the second switching unit 113 and charging the battery 20; a switching control unit 122 controlling switching of the first switching unit 109 and the second switching unit 113; a second circuit breaking unit 118 breaking a line connected to the battery 20 when malfunction occurs; and a second line breaking unit 128 connected to the second circuit breaking unit 118 in parallel and breaking a line depending on operation.

This isolated bidirectional DC-DC converter 100 performs bidirectional DC-DC voltage conversion between the DC grid system 10 and the battery 20 when the voltage is supplied from the DC grid system 10 to the battery 20 or when the voltage stored in the battery 20 is supplied to the DC grid system 10.

When a large load (heavy load) is connected to the DC grid system 10 while the DC grid system supplies power to a load (not shown) connected thereto, the DC grid system receives the energy stored in the battery 20 to handle the large load. Conversely, in the case of the small load (light load), the surplus energy is stored in the battery 20. Further, when the remaining charge voltage of the battery 20 drops to a preset reference value or below, the battery 20 is switched into a charging mode and the DC grid system 10 supplies a voltage to the battery 20 for charging.

Here, depending on the capacity of the load connected in the charging mode of the battery 20 where the voltage is supplied from the DC grid system 10 to the battery 20 or in a discharging mode of the battery 20 where the voltage is supplied from the battery 20 to the DC grid system 10, switching of the first switching unit 109 and the second switching unit 113 is controlled through various switching controls, thereby enhancing the efficiency of the bidirectional DC-DC converter 100.

Further, the isolated bidirectional DC-DC converter 100 according to the present invention operates in two operation modes. That is, it operates in a DC system-connected type and a stand-alone type. The DC system connected type operation is an operation mode when the DC grid system 10 is normal, and the stand-alone type operation is an operation mode when the DC grid system 10 malfunctions or is abnormal.

The first capacitor 107 is connected to the DC grid system 10 in parallel and is charged with the voltage output from the DC grid system 10 or with the voltage to be supplied to the DC grid system 10.

The first circuit breaking unit 104 breaks the line in the case of a short circuit or an overload to protect the device and the circuit such that fire, accidents, and the like that may occur due to the short circuit, the overload, and the like are prevented. Further, the first circuit breaking unit 104 is turned on so that the capacitor 107 is charged with the voltage output from the DC grid system 10.

The first line breaking unit 125 is connected to the first circuit breaking unit 104 in parallel, and is turned off depending on the operation of the DC-DC converter 100 to break the line if needed. When being turned on, it connects the line so that power is supplied from the DC grid system 10.

The positive (+) terminal of the first circuit breaking unit 104 is connected to a first charging resistor 123 in parallel and the negative (−) terminal is connected to a second charging resistor 124 in parallel. The first charging resistor 123 and the second charging resistor 124 are connected to the first line breaking unit 125 in series.

The first switching unit 109 includes a first switch 109a, a second switch 109b, a third switch 109c, and a fourth switch 109d that are connected in the full-bridge form. Here, a contact of the first switch 109a and the second switch 109b is connected to one side of the first capacitor 107, and a contact of the third switch 109c and the fourth switch 109d is connected to the other side of the first capacitor 107. These first to fourth switches 109a to 109d are implemented as MOSFETs or IGBT switches.

The transformer 110 transfers the voltage from the primary side to the secondary side or from the secondary side to the primary side. One side of the primary side winding 110a is connected to a contact N1 where the first switch 109a is connected to the third switch 109c, and the other side of the primary side winding 110a is connected to a contact N2 where the second switch 109b is connected to the fourth switch 109d.

The second switching unit 113 includes a fifth switch 113a, a sixth switch 113b, a seventh switch 113c, and an eighth switch 113d that are connected in the full-bridge form. Here, a contact N3 of the fifth switch 113a and the seventh switch 113c is connected to one side of the secondary side winding 110b of the transformer 110, and a contact N4 of the sixth switch 113b and the eighth switch 113d is connected to the other side of the secondary side winding 110b of the transformer 110. These fifth to eighth switches 113a to 113d are also implemented as MOSFETs or IGBT switches.

The second capacitor 114 is provided with one side connected to the contact of the fifth switch 113a and the sixth switch 113b, and with the other side connected to the contact of the seventh switch 113c and the eighth switch 113d. The voltage stored in the second capacitor 114 is used for charging the battery 20.

The second circuit breaking unit 118 breaks the line in the case of the short circuit or the overload to protect the device and the circuit such that fire, accidents and the like that may occur due to the short circuit, the overload, and the like are prevented. Further, the second circuit breaking unit 118 is turned on so that the battery 20 is charged with the voltage with which the second capacitor 114 is charged or the second capacitor 114 is charged with the voltage of the battery 20.

The second line breaking unit 128 is connected to the second circuit breaking unit 118 in parallel, and is turned off depending on the operation of the DC-DC converter 100 to break the line if needed. When being turned on, it connects the line so that the battery 20 is charged with the voltage or the voltage of the battery 20 is discharged.

The positive (+) terminal of the second circuit breaking unit 118 is connected to a third charging resistor 126 in parallel and the negative (−) terminal is connected to a fourth charging resistor 127 in parallel. The third charging resistor 126 and the fourth charging resistor 127 are connected to the second line breaking unit 128 in series.

In the meantime, according to another embodiment of the present invention, the isolated bidirectional DC-DC converter 100 further includes: a first fuse unit 101, a second fuse unit 102, a first EMC filter unit 103, a first inductor 105, a first current detecting unit 106, a first voltage detecting unit 108 between the DC grid system 10 and the first capacitor 107; and a second voltage detecting unit 115, a second inductor 116, a second current detecting unit 117, a second EMC filter unit 119, a third fuse unit 120, and a fourth fuse unit 121 between the second capacitor 114 and the battery 20.

The first fuse unit 101 and the second fuse unit 102 are provided at the respective lines connected to the positive (+) terminal and the negative (−) terminal of the DC grid system 10, respectively, and open the lines when the overcurrent equal to or greater than a preset reference current flows in the corresponding lines. This DC grid system 10 supplies the DC voltage to a load (not shown) connected thereto or supplies the voltage to the battery 20 for charging.

The first EMC filter unit 103 is connected to the DC grid system 10 in parallel and protects the DC-DC converter 100 so that electromagnetic waves or noise signals from peripheral devices do not interfere with the performance of other devices or elements, and simultaneously removes the electromagnetic waves or noise signals from the peripheral devices so that the converter is protected against the influence of electromagnetic waves to provide the normal performance.

The first inductor 105 is connected to the first fuse unit 101 in series and is used to control the current provided from the DC grid system 10.

The first current detecting unit 106 detects the current flowing through the first inductor 105. The first current detecting unit 106 uses a current transformer (CT).

The first voltage detecting unit 108 detects the voltage with which the first capacitor 107 is charged. The first voltage detecting unit 108 uses a potential transformer (PT).

A first auxiliary inductor 111 is provided with one side connected to the primary side winding 110a of the transformer 110, specifically one side of the primary side winding 110a, and is provided with the other side connected to the contact N1. A second auxiliary inductor 112 is connected to the secondary side winding 110b of the transformer 110 in series, and is provided with one side connected to one side of the secondary side winding 11b and with the other side connected to the second switching unit 113.

The second voltage detecting unit 115 detects the voltage stored in the second capacitor 114. The second voltage detecting unit 115 is implemented, for example, as a potential transformer (PT).

The second inductor 116 is provided with one side connected to the contact where the fifth switch 113a is connected to the sixth switch 113b, and with the other side connected to the second circuit breaking unit 118 at the rear end.

The second current detecting unit 117 detects the current flowing in the second inductor 116. The second current detecting unit 117 is implemented as a current transformer (CT).

The second EMC filter unit 119 is connected to the second circuit breaking unit 118 in parallel and protects, like the first EMC filter unit 103, the device so that electromagnetic waves or noise signals from various types of devices generating electromagnetic waves do not interfere with the performance of other devices or element, and simultaneously removes the electromagnetic waves or noise signals from other devices so that the device is protected against the influence of electromagnetic waves to provide the normal performance.

The third fuse unit 120 and the fourth fuse unit 121 are provided at the respective lines connected to the positive (+) terminal and the negative (−) terminal of the battery 20, respectively, and open the lines when the overcurrent equal to or greater than a preset reference current flows in the corresponding lines.

In the isolated bidirectional DC-DC converter 100 according to the present invention, the switching control unit 122 controls the switching of the first to fourth switches 109a to 109d of the first switching unit 109 and the fifth to eighth switches 113a to 113d of the second switching unit 113, individually, thereby controlling the bidirectional power flow between the DC grid system 10 and the battery 20.

Regarding the switching control by the switching control unit 122, PSM switching control, SPWM switching control, and DPWM switching control are used together depending on the voltage of the DC grid system 10, specifically the size of the charge voltage with which the first capacitor 107 is charged, and on the voltage of the battery 20, specifically the size of the charge voltage with which the second capacitor 114 is charged. This means that the voltage of the DC grid system 10 and the voltage of the battery 20 are detected and depending on the difference between the two voltages when the battery 20 is charged or discharged, PSM, SPWM, and DPWM switching controls are used together.

For example, in the embodiment, when charging the battery 20 by the DC grid system 10, the battery 20 serves as a load. When the voltage of the battery 20 is lower than the voltage of the DC grid system 10, the DPWM switching control is used in the case of the light load which is less than the rating and the SPWM switching control is used in the case of the heavy load or high load (including the rating).

Also, when the voltage of the battery 20 is higher than the voltage of the DC grid system 10, the DPWM switching control is used in the case of the light load which is less than the rating and the SPWM switching control is used in the case of the heavy load of high load (including the rating).

However, when the voltage of the DC grid system 10 is similar to the voltage of the battery 20, the SPWM switching control is used in the case of the light load which is less than the rating and the PSM switching control is used in the case of the heavy load or high load (including the rating).

As described above, the charge voltage of the battery 20 is compared with the charge voltage of the DC grid system 10 to select among the SPWM, DPWM, and PSM switching controls for use. The selection among the switching controls is determined depending on the voltage of the DC grid system 10, the voltage of the battery 20, and the load capacity as described above. The first capacitor 107 is charged with the voltage of the DC grid system 10 and the second capacitor 114 is charged with the voltage of the battery 20, so that in the present invention, the charge voltages of the first capacitor 107 and the second capacitor 114 are detected and the detected charge voltages and the load capacity are used for the determination.

This is fulfilled in a manner that simulation of which switching control is efficient depending on the characteristics and the type of load is stored in an internal memory (not shown) in advance, and afterward the switching control is selected in practice, which achieves high efficiency in compliance with the characteristics and the type of load.

According to the selected various switching controls as described above, the operations of the first switching unit 108 and the second switching unit 113 are controlled by the switching control unit 122. Particularly, the switching control unit 122 appropriately turns on/off the multiple switches 109a to 109d and 113a to 113d within the first and the second switching unit 108 and 113 according to the bidirectional power flow of the bidirectional DC-DC converter 100, whereby the first and the second switching unit 108 and 113 are operated.

The following Table 1 shows the efficiency (unit: %) depending on the charge capacity from the DC grid system 10 to the battery 20 in an experimental example where according to the embodiment of the present invention, an input voltage input to the battery 20 from the DC grid system, specifically the charge voltage of the first capacitor 107, is set to 750 Vdc; the charge voltage of the battery 20, specifically the charge voltage of the second capacitor 114, is set to 580 Vdc, 650 Vdc, 700 Vdc, 750 Vdc, and 820 Vdc; and the load capacity of which the rated capacity is 50 kW is converted in a range of 5 to 50 kW in units of 5 kW.

TABLE 1

| First capacitor voltage [Vdc] | Second capacitor voltage [Vdc] | Switching control | Load capacity [kW] | | | | | | | | | |
|---|---|---|---|---|---|---|---|---|---|---|---|---|
| | | | 5 | 10 | 15 | 20 | 25 | 30 | 35 | 40 | 45 | 50 |
| 750 | 580 | PSM | 76.0 | 83.6 | 87.8 | 90.2 | 92.3 | 92.9 | 92.9 | 92.7 | 92.4 | 92.0 |
| | | SPWM | 84.4 | 91.4 | 93.6 | 94.8 | 95.4 | 95.9 | 96.2 | 95.7 | 95.6 | 95.5 |
| | | DPWM | 87.0 | 92.5 | 94.1 | 94.3 | 95.1 | 95.5 | 95.8 | 95.3 | 95.2 | 95.0 |
| | 650 | PSM | 85.0 | 91.2 | 93.8 | 95.1 | 95.9 | 96.4 | 96.8 | 96.7 | 96.6 | 96.5 |
| | | SPWM | 87.9 | 93.2 | 95.3 | 96.3 | 96.3 | 96.3 | 96.5 | 97.0 | 96.9 | 96.7 |
| | | DPWM | 89.0 | 94.3 | 95.2 | 96.0 | 96.0 | 96.0 | 96.2 | 96.7 | 96.6 | 96.3 |

TABLE 1-continued

| First capacitor voltage [Vdc] | Second capacitor voltage [Vdc] | Switching control | Load capacity [kW] | | | | | | | | | |
|---|---|---|---|---|---|---|---|---|---|---|---|---|
| | | | 5 | 10 | 15 | 20 | 25 | 30 | 35 | 40 | 45 | 50 |
| | 700 | PSM  | 90.5 | 95.2 | 95.7 | 96.8 | 97.4 | 97.4 | 97.4 | 97.4 | 97.2 | 97.0 |
| | | SPWM | 91.5 | 95.2 | 95.7 | 96.4 | 97.3 | 97.3 | 97.4 | 97.3 | 97.1 | 96.9 |
| | | DPWM | 91.8 | 95.5 | 95.7 | 96.4 | 97.2 | 97.1 | 97.1 | 97.1 | 96.9 | 96.9 |
| | 750 | PSM  | 94.1 | 97.2 | 97.6 | 97.6 | 97.6 | 97.6 | 97.5 | 97.5 | 97.4 | 97.2 |
| | | SPWM | 96.2 | 97.3 | 97.5 | 97.5 | 97.5 | 97.4 | 97.4 | 97.3 | 97.1 | 97.0 |
| | | DPWM | 96.0 | 97.3 | 97.4 | 97.4 | 97.4 | 97.4 | 97.4 | 97.3 | 97.1 | 97.0 |
| | 820 | PSM  | 85.0 | 91.2 | 93.8 | 95.1 | 95.9 | 96.4 | 96.8 | 96.7 | 96.6 | 96.5 |
| | | SPWM | 87.8 | 93.1 | 85.0 | 96.0 | 96.8 | 97.1 | 97.3 | 97.3 | 97.3 | 97.1 |
| | | DPWM | 89.0 | 94.3 | 95.2 | 96.0 | 96.0 | 96.0 | 96.2 | 96.7 | 96.6 | 96.3 |

As shown in Table 1 above, in the case where the voltage of the DC grid system 10, specifically the charge voltage of the first capacitor 107, is fixed to 750 Vdc, when the voltage of the battery 20, specifically the charge voltage of the second capacitor 114, is relatively low (for example: 580 Vdc, 650 Vdc) or relatively high (for example: 820 Vdc), it is found that the DPWM switching control is efficient in the light load region where the load capacity is less than 20% of the rated capacity and the SPWM switching control is efficient in the heavy load or high load region where the load capacity is equal to or greater than 20%. Further, when the charge voltage of the second capacitor 114 is similar to the charge voltage of the first capacitor 107 (for example: 700 Vdc, and 750 Vdc), it is found that the SPWM switching control is efficient in the light load region where the load capacity is less than 20% of the rated capacity and the PSM switching control is efficient in the heavy load or high load region where the load capacity is equal to or greater than 20%.

Here, 20% of the rated capacity is a reference value for determining the switching control mode depending on the load capacity and is determined by the experiment as described above. This is determined differently depending on the characteristics of the DC-DC converter 100, the DC grid system 10, and the battery 20. For example, when the rated capacity of the lode is 100 kW, 20% is possible. In the embodiment, preferably, 15 to 25% is appropriate through the experiment as described above.

As can be known from the experimental example and Table 1, the switching modes of the first switching unit 109 and the second switching unit 113 of the isolated bidirectional DC-DC converter 100 are determined depending on the output voltage of the battery 20 (the voltage of the second capacitor) and the load capacity when the input voltage of the DC grid system 10 (the voltage of the first capacitor) is fixed. Particularly, when the output voltage fluctuates greatly depending on the load, specifically when the output voltage is relatively small or greater than the input voltage, the DPWM switching control is performed in the case of the low load capacity and the SPWM switching control is performed in the case of the high load capacity. When the input voltage is similar to the output voltage, the SPWM switching control is performed in the case of the low load capacity and the PSM switching control is performed in the case of the high load capacity, whereby the overall efficiency of the system is enhanced.

In the above, preferably, whether the load capacity is high or low is determined on the basis of the 20% of the rated capacity of the load, but the present invention is not limited thereto.

The efficiencies shown in Table 1 are an example and vary with input, output, and the load capacity. As described above, which switching control between the PSM switching control and the SPWM switching control is efficient is determined in advance depending on the characteristics of equipment and elements and on the type of load to be applied, then information related thereto is stored in the internal memory in advance. Afterward, the switching controls are switched in compliance with input, output, and the load capacity applied in actual operation, thereby enhancing the efficiency.

The switching control unit 122 according to the present invention changes the direction of power flow from the primary side to the secondary side of the transformer 110 or from the secondary side to the primary side depending on the type of load connected to the primary side or to the secondary side of the transformer 110 in the isolated bidirectional DC-DC converter 100, thereby controlling the switching operations of the first switching unit 109 and the second switching unit 113.

The operation of the isolated bidirectional DC-DC converter 100 having such a configuration will be described.

First, when the power flow occurs from the primary side to the secondary side of the transformer 110, specifically when the DC grid system 10 supplies the voltage to the battery 20 for charging, the first switching unit 109 is operated by the switching control unit 122 and the voltage converted from the primary side to the secondary side of the transformer 110 is induced. Afterward, the second capacitor 114 is charged by switching of the second switching unit 113, and the power is supplied to the battery 20. Consequently, the battery 20 is charged. Here, depending on the charge capacity of the battery 20, specifically the type of load and high efficiency switching control information stored in advance as shown in the example in Table above, the PSM switching control, the SPWM switching control, and the DPWM switching control are selectively used.

Further, when the power flow occurs from the secondary side to the primary side of the transformer 110, specifically when the battery 20 supplies the power to the DC grid system 10 lacking power, the switching operations of the second switching unit 113 and the first switching unit 109 are performed by the switching control unit 122 and the voltage induced from the secondary side to the primary side of the transformer 110 is stored in the first capacitor 107 and is applied to the DC grid system 10.

Figure 2:
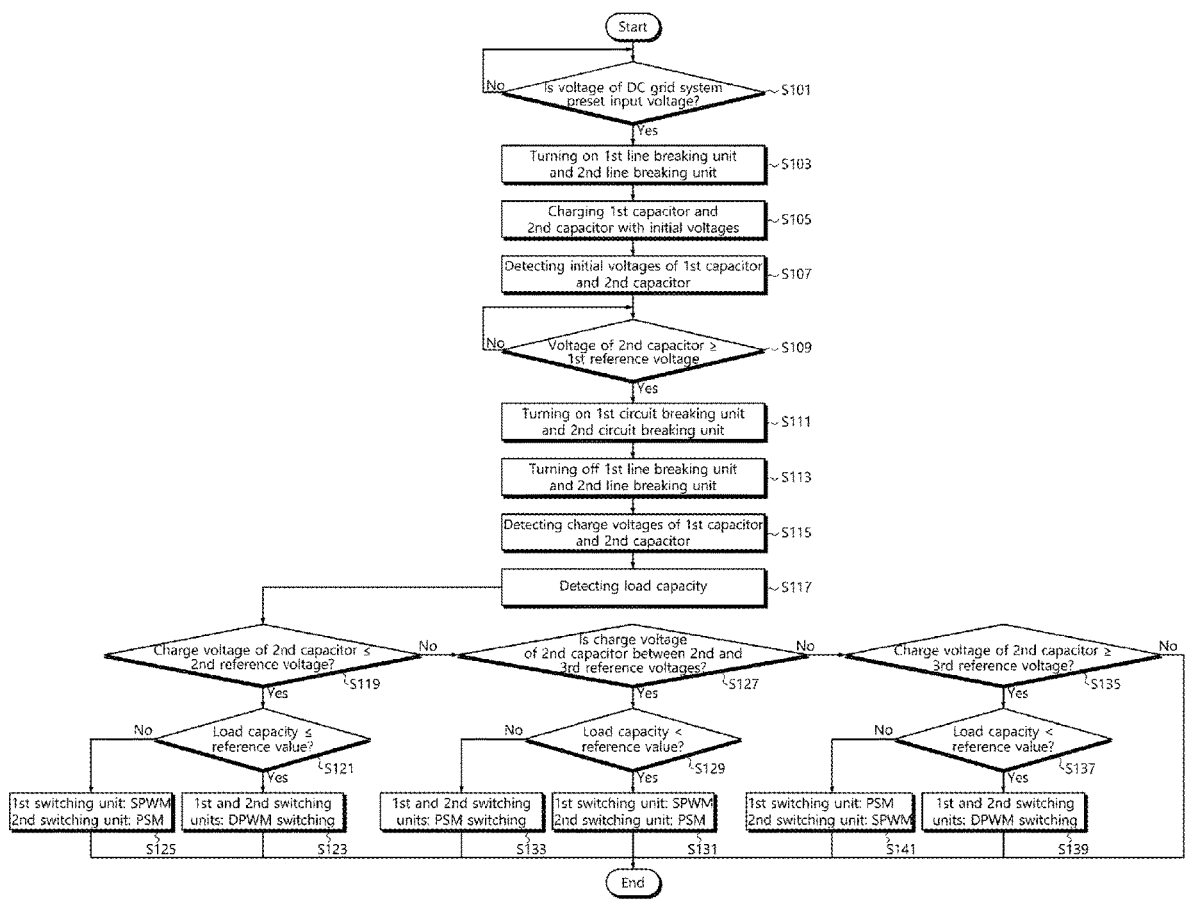
FIG. 2 is a flowchart illustrating a switching control method for an isolated bidirectional DC-DC converter according to an embodiment of the present invention.

FIG. 2 is a flowchart illustrating a switching control method for an isolated bidirectional DC-DC converter according to an embodiment of the present invention.

In FIG. 2, the isolated bidirectional DC-DC converter 100 according to the present invention includes: the first circuit breaking unit 104 breaking the line connected to the DC grid system 10 when malfunction occurs; the first line breaking unit 125 connected to the first circuit breaking unit 104 in parallel and breaking the line depending on operation; the first capacitor 107 charging with the voltage supplied from the DC grid system 10; the first switching unit 109 connected to the first capacitor 107 in parallel and including multiple switches 109a to 109d in the full-bridge form; the transformer 110 provided with the primary side winding to which the output terminal of the first switching unit 109 is connected; the second switching unit 113 connected to the secondary side output terminal of the transformer 110 and including multiple switches 113a to 113d in the full-bridge form; the second capacitor 114 storing the output voltage of the second switching unit 113 and charging the battery 20; the switching control unit 122 controlling the switching of the first and the second switching unit 109 and 113; the second circuit breaking unit 118 breaking the line connected to the battery 20 when malfunction occurs; and the second line breaking unit 128 connected to the second circuit breaking unit 118 in parallel and breaking the line depending on operation, wherein the bidirectional power flow between the DC grid system 10 and the battery 20 is switched.

In FIG. 2, for convenience of description, as an example, like the above-described experimental example, the description will be made assuming that the input voltage input from the DC grid system 10 is 750 V and the output voltage output to the battery 20 to be stored in the battery 20 ranges from 580 to 820 V. However, the present invention is not limited thereto, and the input voltage and the output voltage are set differently depending on the characteristics of the DC-DC converter 100, and the characteristics and the capacity of the DC grid system 10 and of the battery 20.

Referring to FIG. 2, it is determined whether the input voltage in the DC grid system 100 is a preset voltage, for example, 750 V at step S101. When the input voltage is 750 V, the first line breaking unit 125 and the second line breaking unit 128 are turned on at step S103 and the first capacitor 107 and the second capacitor 114 are charged with initial voltages through the first and the second charging resistor 123 and 124 and the third and the fourth charging resistor 126 and 127 from the power of the DC grid system 10 and of the battery 20, respectively at step S105.

As described above, during charging of the first capacitor 107, the charge voltages with which the first capacitor 107 and the second capacitor 114 are charged are detected at step S107.

When the detected charge voltage of the first capacitor 107 is 750 V and the detected charge voltage of the second capacitor 114 is equal to or greater than a first reference voltage, for example, 550 V at step S109, the first circuit breaking unit 104 and the second circuit breaking unit 118 are turned on at step S111 and the first line breaking unit 125 and the second line breaking unit 128 which have been turned on are turned off at step S113.

After the first circuit breaking unit 104 and the second circuit breaking unit 118 are turned on, the charge voltages of the first capacitor 107 and the second capacitor 114 are detected at step S115, then the load capacity is detected at step S117.

As described above, depending on the charge voltages of the first and the second capacitor 107 and 114 and on the load capacity, switching control techniques for the first and the second switching unit 109 and 113 are selected.

Specifically, in the case where the charge voltage of the second capacitor 114 is equal to or less than a second reference voltage, for example, 700 V at step S119, when the load capacity is equal to or less than a preset reference value of the rated capacity, for example, 20% at step S121, the first and the second switching unit 109 and 113 are switched with the DPWM switching control at step S123, and when being equal to or greater than 20%, the first switching unit 109 is switched with the SPWM switching control and the second switching unit 113 is switched with the PSM switching control at step S125.

In the case where the charge voltage of the second capacitor 114 is between the second reference voltage and a third reference voltage, for example, between 700 V and 750 V at step S127, when the load capacity is less than the preset reference value of the rated capacity, for example, 20% at step S129, the first switching unit 109 is switched with the SPWM switching control and the second switching unit 113 is switched with the PSM switching control at step S131, and when being less than 20%, the first and the second switching unit 109 and 113 are switched with the PSM switching control at step S133.

In the case where the charge voltage of the second capacitor 114 is equal to or greater than the third reference voltage, for example, 800 V at step S135, when the load capacity is less than the preset reference value of the rated capacity, for example, 20% at step S137, the first and the second switching unit 109 and 113 are switched with the DPWM switching control at step S139, and when being equal to or greater than 20%, the first switching unit 109 is switched with the PSM switching control and the second switching unit 113 is switched with the SPWM switching control at step S141.

Here, the second reference voltage and the third reference voltage are determined on the basis of the charge voltage of the first capacitor 107. The voltage lower than the charge voltage of the first capacitor 107 is set. For example, when the charge voltage of the first capacitor 107 is 750 V, the second reference voltage is set to 700 V. The voltage higher than the charge voltage of the first capacitor 107 is set, for example, the third reference voltage is set to 750 V. In the embodiment, the above example is described as an example, but the second and the third reference voltage may be changed.

As described above, in the bidirectional DC-DC converter 100 provided between the DC grid system 10 and the battery 20 and switching the bidirectional power flow, PSM, SPWM, and DPWM switching controls are used together in response to the fluctuation in the voltage of the battery 20 and the switches of the first switching unit 109 and of the second switching unit 113 are switched, thereby enhancing the efficiency of the system.

In the above description, although a description has been made such that all elements constituting embodiments of the present invention are combined into a single element or are operated with the elements being combined with each other, the present invention is not limited to those embodiments. That is, within the scope of the present invention, one or more of all elements may be selectively combined and operated. Further, it should be understood that terms such as "comprise", "include", or "have" are merely intended to indicate that the corresponding element is internally present, unless a description to the contrary is specifically pointed out in context, and are not intended to exclude the possibility that other elements may be additionally included. Unless otherwise defined, all terms including technical and scientific terms have the same meaning as commonly understood by those skilled in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The above description is merely intended to exemplarily describe the technical spirit of the present invention, and those skilled in the art will appreciate that various changes and modifications are possible without departing from the essential features of the present invention. Therefore, the embodiments disclosed in the present invention are not intended to restrict the technical spirit of the present invention and are merely intended to describe the present invention, and the scope of the present invention is not limited by those embodiments. The protection scope of the present invention should be defined by the accompanying claims, and the entire technical spirit of equivalents thereof should be construed as being included in the scope of the present invention.

The invention claimed is:

1. A switching control method for an isolated bidirectional DC-DC converter including: a first circuit breaking unit breaking a line connected to a DC grid system when malfunction occurs; a first line breaking unit connected to the first circuit breaking unit in parallel and breaking a line depending on operation; a first capacitor charging with a voltage supplied from the DC grid system; a first switching unit connected to the first capacitor in parallel and having multiple switches in a full-bridge form; a transformer provided with a primary side to which an output terminal of the first switching unit is connected; a second switching unit having multiple switches in a full-bridge form connected to a secondary side of the transformer; a second capacitor storing an output voltage of the second switching unit and charging a battery; a switching control unit controlling switching of the first switching unit and the second switching unit; a second circuit breaking unit breaking a line connected to the battery when malfunction occurs; and a second line breaking unit connected to the second circuit breaking unit in parallel and breaking the line depending on operation, wherein bidirectional power flow between the DC grid system and the battery is switched, the method comprising:

determining whether a voltage of the DC grid system is a preset input voltage;

turning on the first line breaking unit and the second line breaking unit when the preset input voltage is determined, and charging the first capacitor and the second capacitor with initial voltages;

detecting the initial voltages of the first capacitor and the second capacitor;

turning on the first circuit breaking unit and the second circuit breaking unit when the detected initial voltages are a first reference voltage preset;

turning off the first line breaking unit and the second line breaking unit after the first circuit breaking unit and the second circuit breaking unit are turned on;

detecting, in real time, charge voltages with which the first capacitor and the second capacitor are charged;

detecting load capacity of a load connected to the battery; and switching the first switching unit and the second switching unit depending on the charge voltages of the first capacitor and the second capacitor and on the load capacity, wherein the switching is performed using phase shift modulation (PSM), single pulse width modulation (SPWM), and double pulse width modulation (DPWM) switching controls together, wherein in a case where the charge voltage of the second capacitor is less than a second reference voltage preset, when the load capacity is lower than a preset reference value of rated capacity of the load, the first switching unit and the second switching unit are switched with the DPWM switching control, and when the load capacity is equal to or greater than the preset reference value, the first switching unit is switched with the SPWM switching control and the second switching unit is switched with the PSM switching control.

2. The method of claim 1, wherein in a case where the charge voltage of the second capacitor is between the second reference voltage and a third reference voltage preset, when the load capacity is less than the preset reference value, the first switching unit is switched with the SPAM switching control and the second switching unit is switched with the PSM switching control, and when the load capacity is equal to or greater than the preset reference value, the first switching unit and the second switching unit are switched with the PSM switching control.

3. The method of claim 2, wherein in a case where the charge voltage of the second capacitor is equal to or greater than the third reference voltage, when the load capacity is less than the preset reference value, the first switching unit and the second switching unit are switched with the DPWM switching control, and when the load capacity is equal to or greater than the preset reference value, the first switching unit is switched with the PSM switching control and the second switching unit is switched with the SPWM switching control.

4. The method of claim 3, wherein the second reference voltage is lower than the charge voltage of the first capacitor, and the third reference voltage is higher than the charge voltage of the first capacitor.

5. The method of claim 3, wherein the preset reference value is in a range of 15 to 25% of the rated capacity of the load.

* * * * *